UNITED STATES PATENT OFFICE.

SAMUEL SULZBACHER, OF CINCINNATI, OHIO.

REMOVABLE HANDLE FOR VESSELS.

1,296,228.  Specification of Letters Patent.  Patented Mar. 4, 1919.

Application filed February 10, 1917. Serial No. 147,898.

*To all whom it may concern:*

Be it known that I, SAMUEL SULZBACHER, a citizen of the United States, residing at the city of Cincinnati, in the county of Hamilton and State of Ohio, have invented certain new and useful Improvements in Removable Handles for Vessels, of which the following is a specification.

The object of my invention is to produce a cheap, simple and highly efficient removable handle for vessels so that they may be lifted at will and replaced, usually on and off of stoves, ranges and the like.

It is especially applicable in lifting vessels which have no handles, but can also be used with vessels which have handles when they are heavy, or weigh heavy on account of their contents and under these conditions they can be used in connection with the handle on the vessel and both hands can be used to lift said heavy vessel.

One of the salient features of the invention consists in gripping the vessel on the inside and on the periphery at the top edge or rim and in increasing the pressure against the inside and outside of the vessel so that a firm and unyielding grip can be effected; the grip on the vessel can be instantly released by relieving the pressure.

Its various features and advantages will readily become apparent from a perusal of the following specification.

In the accompanying drawing forming part of this specification:

Figure 1:
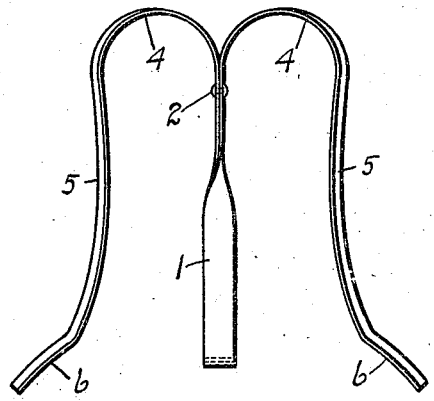
Figure 1, is a plan view of the device.

The device is usually made of one strip of spring metal of any preferred kind. The strip is bent double in the middle and forms two loops rounding at the back part and then extending forward and ending in flaring ends. The doubled central or middle part is marked 1 and it is usually riveted at 2 and at its forward part is bent down to form a finger 3, this part also being twisted for strength; the side loops are rounded at 4 and then extend forward forming arms 5 which terminate in flaring ends or fingers 6.

The arms 5 may be equidistant from the central part 1 and they may be of any shape or contour which best adapts them to be manipulated by the hand of the operator in squeezing them toward each other or together or relaxing the hold to allow said arms to spring or move back to a normal position. The finger 3 extends slightly above the level of the arms 5—5, so that when the arms are squeezed together a better hold can be taken on the vessel rim or edge, however, I may make said finger of any shape or form.

Figure 2:
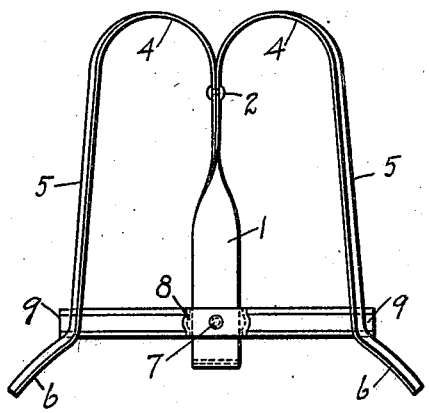
Fig. 2, is a plan view thereof made in a slightly modified form.
Figure 3:
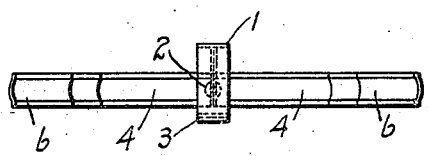
Fig. 3, is a front view of the device shown in Fig. 1.
Figure 4:
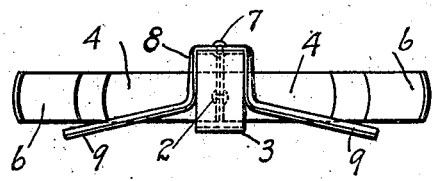
Fig. 4, is a front view of the device shown in Fig. 2.
Figure 5:
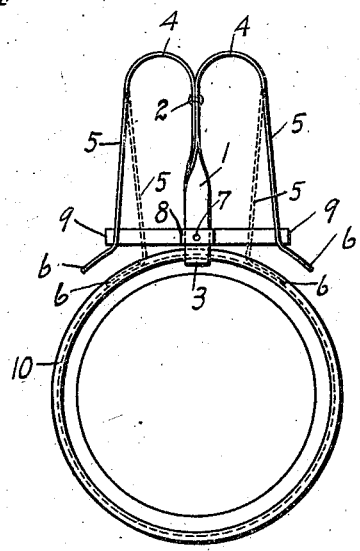
Fig. 5, is a plan view of the device engaging the rim or edge of a vessel.

The device shown in Figs. 2, 4 and 5 is approximately of same form and construction as the device shown in Figs. 1 and 3, except that I rivet at 7 on central piece 1, forward near the finger 3, a guide piece or bar formed of raised part or hood 8 and the two arms 9, one extending outward from each side of the hood 8; these parts are all preferably made integral and of any desired material. The arms 9 incline downward toward the sides, but may be of any shape or extended outward at any angle. The forward part of arms 5—5 presses against the face of the said arms 9 of the guide bar.

The manner in which the device is used is shown in Fig. 5. The user places the finger on the inside of the mouth or rim of the vessel 10 at its edge and said finger extends down into the vessel to be lifted, the side arms 5—5 are then squeezed together or toward each other—this brings the flaring fingers 6—6 against the periphery of the vessel at its outside upper edge and brings the finger 3 tightly against the vessel on the inside, as shown by dotted lines in Fig. 5; the vessel thus tightly and firmly gripped can be moved to any point or place and the hold on the device can now be relaxed and it will spring or go back into normal position and it can be lifted off of the vessel.

It will be noted that the closer the arms 5—5 are pulled or squeezed together, the greater the grip on the vessel to be lifted, so this pressure can be governed to suit the kind of vessel to be lifted and its size and weight.

While I have described specifically one method of carrying my invention into effect, it will be understood that the same may be somewhat changed and modified without departing from the spirit and principle of my invention and I wish to be understood as claiming that same modifications will still fall within the scope of my invention.

What I claim as new and my invention and desire to secure by Letters Patent is:

1. In a removable handle for vessels, a central handle piece having a finger at its forward end, said central piece rounded at the rear, and extending outward and forward at each side to form side arms ending in flaring fingers, the arms being united at the rear and the central arm flattened at its forward end; the arms capable of being pressed together to grip the vessel in connection with the finger on the central part.

2. In a removable handle for vessels, a central handle piece having a finger at its forward end, said central piece rounded at the rear, and extending outward and forward at its side to form side arms ending in flaring fingers, the arms being united at the rear and the central arm flattened at its forward end; the arms capable of being pressed together to grip the vessel in connection with the finger on the central part, the central finger impinging against the inside of the vessel and the flaring side fingers impinging against the body of the vessel at its periphery.

3. A removable handle for vessels, a central rigid arm forming part of the handle, and having a downwardly extending member and two parallel movable arms spaced therefrom, and a forward guide piece connected to the central arm.

Witness my hand at Cincinnati Ohio, January 29" 1917.

SAMUEL SULZBACHER.

Witnesses:
JOHN W. STREHLI,
H. E. CARSTENS.

Copies of this patent may be obtained for five cents each, by addressing the "Commissioner of Patents, Washington, D. C."